July 15, 1952  M. H. WOLZE  2,603,481
STABILIZER FOR VEHICLE SPRINGS
Filed Nov. 29, 1950
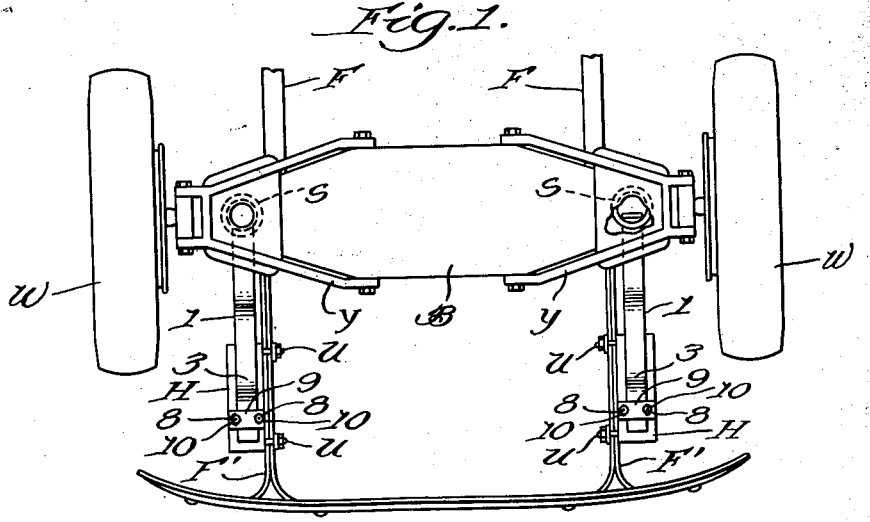
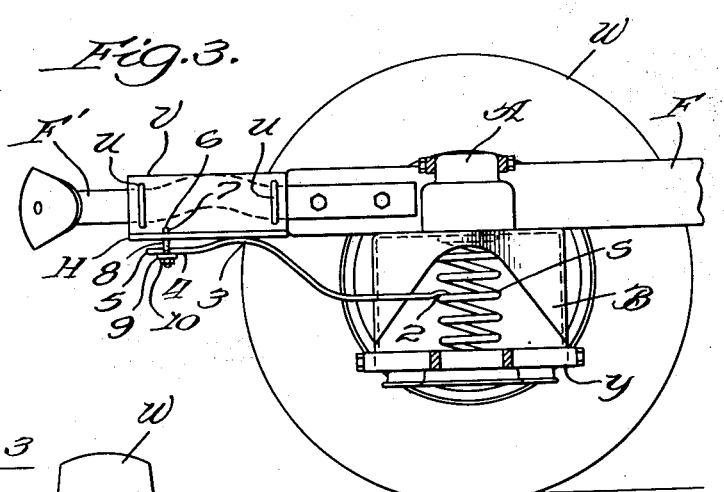
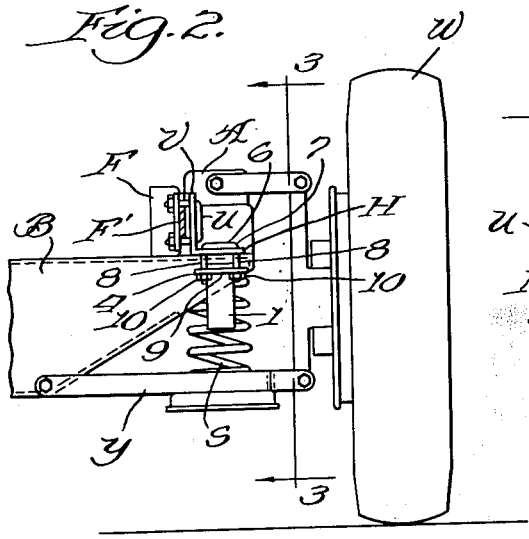
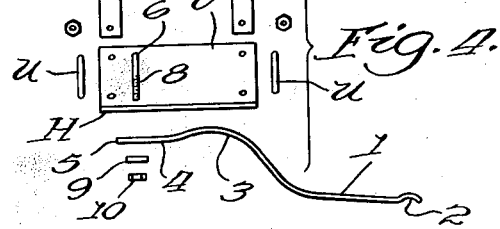
Inventor:
Martin H. Wolze.
By Harold J. Vesconte
Atty.

Patented July 15, 1952

2,603,481

UNITED STATES PATENT OFFICE 2,603,481

STABILIZER FOR VEHICLE SPRINGS

Martin H. Wolze, Glendale, Calif.

Application November 29, 1950, Serial No. 198,160

12 Claims. (Cl. 267—16)

This invention relates to coil spring mounting for automotive vehicles and particularly to an adjustable stabilizing means therefor.

Heretofore, there have been many forms of stabilizers for use with the leaf type of vehicle springs, but there has been no successful effort to devise a stabilizing means for the newer type of coil springs for vehicles which is coming into increasing use. Different drivers desire different types of spring action even in the same model of car depending on the loads carried, the roads commonly used, and the individual preference of the driver and considerable variation is found even in the same model of car with respect to spring action. Ordinarily, the rebound characteristics of vehicles as manufactured are greater than the majority of drivers desire and some type of snubbing action is desirable With these considerations in mind, it is the principal object of the invention to provide an adjustable stabilizing apparatus for motor vehicles having coil springs interposed between the axles and the frame at either or both ends of the vehicle.

Another object of the invention is to provide a stabilizing means for coil spring mountings for motor vehicles which is composed of few parts each of simple design and which is readily installed on vehicles and which does not require any great skill to install.

A further object of the invention is to provide a coil spring stabilizing means for motor vehicles which may be individually adjusted for each spring to equalize the rebound characteristics on opposite sides of the vehicle as is desirable, for example, in the case of cars generally occupied only by the driver.

With the above objects in view, together with such other objects and advantages as may subsequently appear, the invention resides in the parts, and in the construction, combination, and arrangement of parts described, by way of example, in the following specification of one mode of execution of the invention, reference being had to the accompanying drawings which form a part of said specifications and in which drawings:

Fig. 1 is a bottom plan view of the forward end of a motor vehicle showing the invention applied thereto, Fig. 2 is an enlarged front elevation of a front wheel of the vehicle shown in Fig. 1 and the mounting associated therewith and with the invention applied thereto, Fig. 3 is a transverse sectional view taken on the line 3—3 of Fig. 2, and Fig. 4 is an exploded view of the parts constituting the invention and the parts required for its installation on a vehicle such as illustrated in the preceding drawings.

Referring to the drawings, the invention is shown applied to the front end of a vehicle frame supporting assembly comprising wheel assemblies W each including an axle; said axles being interconnected by an assembly comprising a bolster B, lower yoke members Y supporting the lower ends of coil springs S the upper ends of which engage shock absorbers A attached to the side members of the frame F whereby the frame is yieldingly supported on the frame supporting assembly. The invention is intended for all types of vehicles having coil spring frame mounting and the foregoing description is merely by way of identifying the parts of the illustrated vehicle sufficiently to understand the drawings. Additionally, in the illustrated showing of the invention certain brackets are employed, but as will be explained in detail in the specification, the installation will vary with different makes and models of vehicles either requiring different types of brackets or in some cases the brackets may be dispensed with completely.

The invention comprises a heavy leaf type spring member 1 having a shallow U-shaped depression 2 formed transversely of one end adapted to engage the upper surface of an intermediate coil of one of the springs S as best shown in Fig. 3. The member thence extends substantially forward and thence upwardly and forwardly and thence is bent into a shallow inverted U-shaped bend 3, the upper face of which engages the lower face of the horizontal leg H of an angle bracket the vertical leg V of which is clamped by U-bolts U to the vehicle bumper bracket bars F' which are mounted on the frame side members and extend forwardly therefrom. The member 1 extends laterally away from the bend 3 in a short straight leg portion 4 which is spaced below the lower face of the angle bracket as shown in Fig. 3 and the end 5 of the member 1 is connected to the horizontal leg H of the angle bracket by a U-bolt 6 comprising a cross bar 7 having integral, parallel legs 8 extending through holes in the angle bracket and through holes in a cross bar 9 disposed under the end 5 of the member 1 and secured thereon by nuts 10, 10 on the free ends of the U-bolt legs 8.

When thus installed, the member 1 becomes a lever of the first order with the bend 3 serving as the fulcrum thereof. As the nuts 10, 10 are tightened drawing the end 5 toward the angle bracket the change in position of the lever relative to the frame tends to lift the frame away from the axle assembly with an increasing proportion of the weight of the frame and body of the vehicle being supported by the portion of the coil spring between the point of engagement by the member 1 and the spring support on the yoke Y. Thus by adjustment a wide range of characteristics of spring action can be obtained and the characteristics on each side may be varied to make them uniform or to accommodate the condition in which the vehicle is continuously occupied only by the driver, especially if the driver is a heavy person.

The action is believed to be obvious. The stiffer action of the stabilizer between the fulcrum point and the coil spring and the portion of the coil spring engaged thereby will check rebound while the softer action of the portion of the coil spring above the stabilizer will more readily absorb the smaller road shocks.

While a single mode of application of the invention is illustrated, it will be appreciated that for other makes and models of vehicles other adaptations and modes of installation may be required. For example, in some cases the bumper brackets are directly in line with the coil springs in which case, the angle bracket can be dispensed with and the fulcrum 3 can bear directly against the underside of either the frame side member or the bumper bracket with the adjusting U-bolt extending over the bumper bracket. On still other makes of vehicles it may be desirable to mount the stabilizer in a position other than parallel to the length of the vehicle as illustrated. All such adaptations are believed to be within the capacity of one skilled in the art and the invention is therefore directed to the stabilizer adapted to engage an intermediate coil of a frame-supporting coil spring and to be adjustably rocked as a lever of the first order by appropriate means incident to varying the characteristics of the spring action in the manner described.

I claim:

1. A spring stabilizing means for a motor vehicle including in combination, a frame including a pair of side members, a frame supporting assembly comprising a pair of wheel suspension yokes connected to the frame and a pair of coil springs disposed one between each of the side members and one of the yokes and yieldingly supporting the frame thereon; said stabilizing means comprising a pair of resilient levers of the first order each having one end thereof provided with a spring coil engaging means engaging an intermediate coil of one of the springs and having a fulcrum point adjacent the other end of the lever engaging the under surface of the vehicle frame, and means connecting the said other end of each lever with the vehicle frame and effective to draw said other end of the lever toward the frame with resultant partial support of the frame by the portion of the spring extending between the point of engagement thereof by said lever and the yoke.

2. A stabilizer for a motor vehicle having in combination, a frame, a frame supporting assembly including a wheel suspension means connected to the frame, and a coil spring interposed between the frame and the wheel suspension means and yieldingly supporting the frame thereon; said stabilizer comprising a resilient lever of the first order having the fulcrum thereof disposed in engagement with a lower surface of the frame and having one end thereof provided with a hook engaging the upper surface of an intermediate coil of the spring, and screw threaded means extending between the opposite end of said lever and the vehicle frame effective to draw said opposite end toward the frame with resultant partial support of the frame by the coils of the spring between the hooked end of said lever and the wheel suspension means.

3. A stabilizer for a motor vehicle having in combination, a frame, a frame supporting assembly including a wheel suspension means connected to the frame, and a coil spring interposed between the frame and the wheel suspension means and yieldingly supporting the frame thereon; said stabilizer comprising a resilient bar having an intermediate portion of its upper surface raised to provide a fulcrum point engaging an under surface of the vehicle frame and having one end thereof provided with a spring coil engaging hook engaging the upper surface of an intermediate coil of the frame supporting spring, and screw threaded means extending between said opposite end of said bar and the vehicle frame operable to adjustably draw said opposite end of said bar toward the under surface of the vehicle frame with resultant variable partial support of the vehicle frame by the spring coils extending between the coil engaging end of said bar and the wheel suspension means.

4. A stabilizer for a motor vehicle including in combination, a frame, a frame supporting assembly including a yoke pivotally connected to the frame, and a coil spring disposed between the yoke and the frame and yieldingly supporting the frame thereon; said stabilizer comprising a resilient lever element of the first order having a spring coil engaging hook on one end thereof engaging the upper surface of an intermediate coil of the spring and having a fulcrum intermediate its ends engaging the under surface of the vehicle frame at a point thereon remote from the spring, and interconnecting means extending between the opposite end of said lever element and the vehicle frame effective to draw said opposite end toward the under surface of the vehicle frame with resultant partial support of said frame by the portion of the spring between the point of engagement thereof by said lever and the yoke.

5. A spring stabilizing means for a motor vehicle including in combination, a frame including a pair of side members, a frame supporting assembly comprising a pair of yokes connected to the frame and a pair of coil springs disposed one between each of the side members and one of the yokes and yieldingly supporting the frame thereon; said stabilizing means comprising a pair of resilient levers of the first order, each having an inverted U-shaped spring coil engaging hook at one end thereof engaging an intermediate coil of one of the springs and a fulcrum point adjacent the other end of the lever engaging the under surface of the vehicle frame, and separate means each connecting the said other end of one of said levers with the vehicle frame and effective to draw said other end of the lever toward the frame with resultant partial support of the frame by the portion of the spring between the point of engagement by said lever and the yoke; each of said levers comprising a spring steel bar bent upwardly and thence downwardly intermediate its ends with resultant formation of said fulcrum point.

6. A spring stabilizing means for a motor vehicle including in combination, a frame including a pair of side members, a frame supporting assembly comprising a pair of yokes connected to the frame and a pair of coil springs disposed one between each of the side members and one of the yokes and yieldingly supporting the frame thereon; said stabilizing means comprising a pair of resilient levers of the first order each having one end thereof shaped to conform to the upper surface of an intermediate coil of one of the springs and a fulcrum point adjacent the other end of the lever engaging the under surface of the vehicle frame, and separate means connecting the said other end of each lever with the vehicle frame and effective to draw said other end of the lever toward the frame with resultant partial support of the frame by the portion of the spring between the point of engagement by said lever and the yoke; said last-named means associated with each of said levers being independently adjustable to vary the proportion of load carried by the portions of the coil springs affected by said levers.

7. Spring stabilizing means for motor vehicles having a coil spring supported frame comprising a resilient leaf spring element having one end of inverted U-shape engaging an intermediate coil of a frame supporting coil spring and extending generally laterally away from the coil spring; said leaf spring element adjacent its other end being bent upwardly and thence downwardly with resultant formation of a fulcrum point engaging the under surface of the vehicle frame structure, and adjustable means extending between the vehicle frame structure and the other end of said leaf spring element operable to rock said element about said fulcrum point with resultant variable partial support of the vehicle frame by the portion of the coil spring extending between the support therefor and the point of engagement therewith by said leaf spring element.

8. Spring stabilizing means for motor vehicles having a coil spring supported frame comprising a resilient leaf spring element having one end of inverted U-shape engaging an intermediate coil of a frame supporting coil spring and extending generally laterally away from the coil spring; said leaf spring element adjacent its other end being bent upwardly and thence downwardly with resultant formation of a fulcrum point engaging the under surface of the vehicle frame structure, and a U-bolt extending over a member of the frame structure and beneath said other end of said leaf spring element operable to draw said other end of said leaf spring element toward the frame structure with resultant increase of the proportion of the load carried by the portion of the coil spring subject to engagement by said leaf spring element.

9. A spring stabilizing means for a motor vehicle including in combination, a frame including a pair of side members, a frame supporting assembly comprising a pair of yokes connected to the frame and a pair of coil springs disposed one between each of the side members and one of the yokes and yieldingly supporting the frame thereon; said stabilizing means comprising a pair of resilient levers of the first order each having a spring coil engaging hook at one end thereof engaging an intermediate coil of one of the springs and having a fulcrum point adjacent the other end of the lever engaging the under surface of the associated side member of the vehicle frame, and a pair of U-bolts each connecting the said other end of one of said levers to the vehicle frame and effective to draw the said other end of the lever with which it is associated toward the frame with resultant partial support of the frame by the portions of the coil springs extending between the point thereof engaged by said levers and the yokes.

10. A stabilizer for a motor vehicle having in combination, a frame, a frame supporting assembly including a wheel suspension means connected to the frame and a coil spring interposed between the frame and the wheel suspension means yieldingly supporting the frame thereon; said stabilizer comprising a resilient lever of the first order having the fulcrum thereof disposed in engagement with a lower surface of the frame and having one end thereof provided with a spring coil engaging hook engaging the upper surface of an intermediate coil of the spring, and a U-bolt connecting said opposite end of said lever to the frame and effective to draw said opposite end toward the frame with resultant increase of the extent of partial support of the vehicle frame by the portion of the coil spring between the point of engagement by said lever and the wheel suspension means.

11. Spring stabilizing means for motor vehicles having a coil spring supported frame comprising a resilient leaf spring element having one end formed in inverted U-shape engaging an intermediate coil of a frame supporting coil spring and with said element extending generally laterally away from the coil spring; said leaf spring element adjacent its other end being bent upwardly and thence downwardly with resultant formation of a fulcrum point engaging the under surface of the vehicle frame structure, and a U-bolt extending between the vehicle frame structure and said other end of said leaf spring element operable to rock said element about its fulcrum with resultant variable partial support of the vehicle frame by the portion of the coil spring extending between the support therefor and the point of engagement by said leaf spring element.

12. A stabilizer for a motor vehicle having in combination, a frame, a frame supporting assembly including a wheel suspension means connected to the frame and a coil spring interposed between the frame and the wheel suspension means yieldingly supporting the frame thereon; said stabilizer comprising a resilient bar having an intermediate portion of its upper surface raised and providing a fulcrum engaging the under surface of the vehicle frame and having one end thereof hooked to engage the upper surface of an intermediate coil of the vehicle spring, and a U-bolt extending between the opposite end of said bar and the vehicle frame operable to adjustably draw said opposite end of said bar toward the under surface of the vehicle frame with resultant variable partial support of the vehicle frame by the spring coils between the hooked end of said bar and the wheel suspension means.

MARTIN H. WOLZE.

REFERENCES CITED

The following references are of record in the file of this patent:

UNITED STATES PATENTS

| Number | Name | Date |
|---|---|---|
| 10,188 | Morse | Nov. 1, 1853 |
| 1,866,677 | Seymour | July 12, 1932 |
| 2,093,822 | Stump | Sept. 21, 1937 |
| 2,181,692 | Crowell | Nov. 28, 1939 |

FOREIGN PATENTS

| Number | Country | Date |
|---|---|---|
| 7,813 | Australia | June 10, 1902 |